H. G. NEWSOM.
MUD SHEDDER FOR VEHICLE WHEELS.
APPLICATION FILED FEB. 3, 1913.

1,085,154.  Patented Jan. 27, 1914.

WITNESSES:
J. C. Ledbetter
J. J. Murray

INVENTOR
Henry G. Newsom,
BY
John M. Spellman
ATTORNEY

COLUMBIA PLANOGRAPH CO., WASHINGTON, D. C.

UNITED STATES PATENT OFFICE.

HENRY G. NEWSOM, OF BOYCE, TEXAS.

MUD-SHEDDER FOR VEHICLE-WHEELS.

1,085,154.  Specification of Letters Patent.  Patented Jan. 27, 1914.

Application filed February 3, 1913. Serial No. 745,848.

*To all whom it may concern:*

Be it known that I, HENRY G. NEWSOM, a citizen of the United States, residing at Boyce, in the county of Ellis and State of Texas, have invented certain new and useful Improvements in Mud-Shedders for Vehicle-Wheels, of which the following is a specification.

My invention relates to a new and useful mud shedder for vehicle wheels, and its object is to provide a device to be attached to the wheels of buggies, carts and light wagons to permit such vehicles to travel along country roads after heavy rains without being impeded in their travel or altogether stopped by an accumulation of mud upon the wheels.

In certain sections the roads become almost impassible after hard rains. This is particularly true where the soil is of the "black waxy" nature. When such soil becomes mud, its adhesive qualities are extremely pronounced and even a light cart with only one occupant, often becomes too great a load for one horse. This is due to the fact that the mud adheres to the rim and collects in a solid mass between the spokes.

Therefore the object of the invention as above stated, is to provide means for overcoming this condition.

The object of the invention more specifically stated is to provide an attachment for vehicle wheels consisting of a member formed of canvas or other heavy material adapted to cover the rim portion of a wheel, and provided with an absorbent pad between the tread portion of said member and the tread portion of the wheel, said attachment being impregnated with oil in order to give its outer surface a mud shedding nature.

Finally the object of the invention is to provide a device of the character described that will be strong, durable, simple, and efficient, and comparatively easy to construct.

Figure 1:
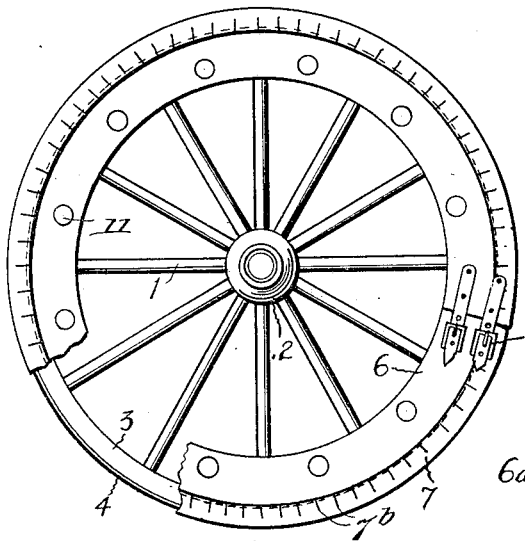
Figure 2:
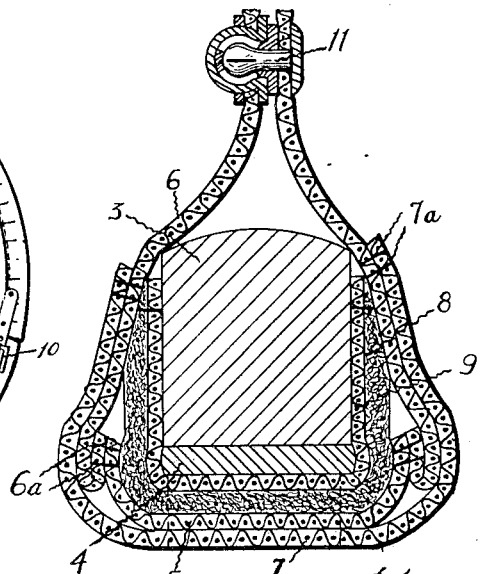
Figure 3:
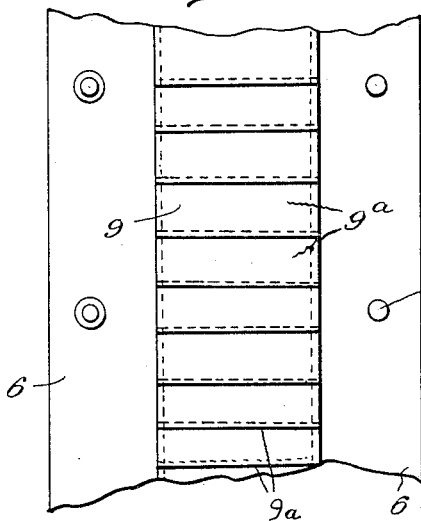
Figure 4:
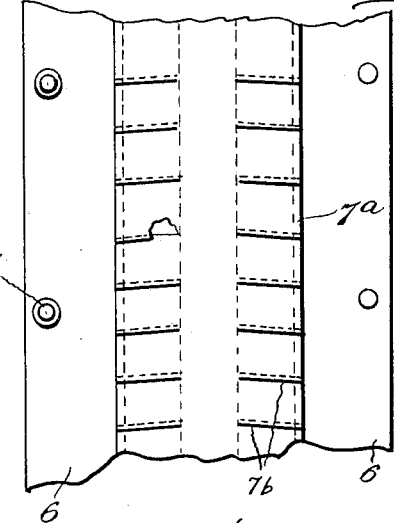

With these and various other objects in view, my invention has relation to certain novel features of the construction and use, an example of which is described in the following specification and illustrated in the accompanying drawing, wherein:

Figure 1 is a view in front elevation of a vehicle wheel equipped with the hereindescribed mud shedding attachment. Fig. 2 is a cross-sectional view of a rim portion of the wheel. Fig. 3 is a fragmentary view showing the interior face of the mud shedding attachment. Fig. 4 is an exterior view of the same.

Referring now more particularly to the drawings, wherein like reference characters designate similar parts in all the figures, the numerals 1, 2, 3 and 4 respectively denote the spokes, hub, felly and tire of the light vehicle wheel. The mud shedding attachment which is correlated with said wheel is formed by a number of longitudinal strips of some heavy fabric such as canvas, said strips being stitched together so as to produce a circular member adapted to conform to the rim portion of the wheel, covering said portion. The main member of the mud shedding attachment is of composite construction being formed of an elongated central strip 5 forming a ring slightly greater in diameter than that of the tire 4, and two lateral strips 6 each sewed along one side to the strip 5 as indicated at 6$^a$, the portions 6 being adapted to cover the lateral faces of the felly and also to extend inward and cover the outer end portions of the spokes. A strip 7 of heavy canvas is secured to the exterior surface of the circular member, the annular edges of said strip 7 being sewed to the two members 6 as indicated at 7$^a$. In order that the strip 7 may conform to the contour of the wheel, its longitudinal edges are first provided with inwardly directed transverse slits, the edges 7$^b$ of which are then overlapped and sewed together as shown in Fig. 4. This construction imparts a cross sectional shape to the strip 7 whereby it will readily assume the form shown in the Fig. 2, the central portion conforming to the tread and the lateral portions conforming to the sides of the felly.

A circumferential strip or pad 8 of yieldable absorbent material such as felt, disposed against the inner faces of the strips 5 and 6, has about the same width as the strip 7. The felt ring 8 is covered and protected and retained in its proper relation to the other parts of the shedder by an inner elongated member 9 conforming to the general circumferential shape. This member 9 is formed of a plurality of transverse strips 9$^a$ arranged in sequent order circumferentially of the shedder and having their adjacent edges superimposed and sewed together as shown in Fig. 3. The member 9 is sewed to the felt member 8 along its longitudinal edges. The construction of the member 9 permits it to readily assume a circular form. Both the felt member 8 and the member 9 when applied to the wheel exhibit a U-shape in cross section.

It will be noted that the parts are fastened together by circumferential stitches 15 passing through the parts 7, 5, 8 and 9 in the order enumerated. It will also be observed that the members 8 and 9 are not attached at their longitudinal edges to members 6 and 7 and consequently sufficient play is given the members 6 to readily place the shedder on the wheel. After the shedder has been placed on the wheel, the adjacent ends of the same may be drawn together and overlapped and fastened by straps and buckle connections 10, two of these connections being placed on each lateral face of the attachment. The opposing members of ordinary resilient socket fasteners 11 are secured in the marginal portions of the members 6 and disposed so as to engage between the spokes as shown in Fig. 2, thus holding the parts in engagement but permitting ready removal of the shedder.

Before the above described attachment is put into use it will be thoroughly soaked in some hydrocarbon oil and the pad 8 will act to retain this oil in the device for a considerable period of time. The oiled surface of the attachment will not offer any retention to the mud tending to adhere thereto so that a vehicle having said attachment upon its wheels will be able to travel along miry roads which would be impassable to the vehicle without the attachment.

The invention is presented as including all such modifications and changes as properly come within the scope of the following claims.

What I claim, is:

1. In a mud shedder for vehicle wheels, a flexible fabric casing adapted to be engaged circumferentially on the rim and tire portions of a wheel and having lateral inwardly directed portions adapted to embrace the spokes of the wheel, and means for fastening the casing on the wheel.

2. In a mud shedder for vehicle wheels, a flexible fabric casing adapted to be engaged circumferentially on the rim and tire portions of a wheel and having lateral inwardly directed portions adapted to embrace the spokes of the wheel, means for fastening the casing on the wheel, and an absorbent member concealed in the casing.

3. In a mud shedder for vehicle wheels, a flexible fabric casing comprising an elongated tread member having lateral members secured to it, a protecting member secured to the exterior of the casing and shaped to embrace the lateral members thereof, an inner protecting member, an elongated absorbent member disposed between the inner member and the casing, means for fastening the ends of the assembled members together, and means for fastening the lateral members of the casing between the spokes of a vehicle wheel.

4. In a mud shedder for vehicle wheels, a flexible fabric casing comprising an elongated tread member having lateral members secured to it, a protecting member secured to the exterior of the casing and shaped to embrace the lateral members thereof, an inner member composed of a plurality of transverse strips arranged in sequent order and having their adjacent edges superimposed, an elongated absorbent member disposed between the inner member and the casing, means for fastening the ends of the assembled members together, and means for fastening the lateral members of the casing between the spokes of a vehicle wheel.

In testimony whereof I have signed my name to this specification in the presence of two subscribing witnesses.

HENRY G. NEWSOM, M. D.

Witnesses:
J. S. MURRAY,
D. B. CARR.

---

Copies of this patent may be obtained for five cents each, by addressing the "Commissioner of Patents, Washington, D. C."